US010084760B2

(12) United States Patent
Pizot et al.

(10) Patent No.: US 10,084,760 B2
(45) Date of Patent: Sep. 25, 2018

(54) SECURE MESSAGES FOR INTERNET OF THINGS DEVICES

(71) Applicant: Hewlett-Packard Development Company, L.P., Houston, TX (US)

(72) Inventors: Laurent Pizot, Vancouver, WA (US); John Cunningham, Leixlip (IE); Stephen D. Panshin, Corvallis, OR (US); Jefferson P. Ward, Brush Prairie, WA (US)

(73) Assignee: Hewlett-Packard Development Company, L. P., Houston, TX (US)

( * ) Notice: Subject to any disclaimer, the term of this patent is extended or adjusted under 35 U.S.C. 154(b) by 305 days.

(21) Appl. No.: 15/068,112

(22) Filed: Mar. 11, 2016

(65) Prior Publication Data

US 2017/0264597 A1 Sep. 14, 2017

(51) Int. Cl.
  *H04L 29/06* (2006.01)
  *H04L 29/08* (2006.01)
  *H04L 9/08* (2006.01)
  *H04L 9/32* (2006.01)
  *H04W 4/70* (2018.01)

(52) U.S. Cl.
  CPC ........ *H04L 63/0442* (2013.01); *H04L 9/0825* (2013.01); *H04L 9/0869* (2013.01); *H04L 9/3247* (2013.01); *H04L 9/3263* (2013.01); *H04L 63/0823* (2013.01); *H04L 63/126* (2013.01); *H04L 67/02* (2013.01); *H04W 4/70* (2018.02)

(58) Field of Classification Search
  USPC ................................................ 713/156, 168
  See application file for complete search history.

(56) References Cited

U.S. PATENT DOCUMENTS

| 9,832,019 | B2* | 11/2017 | Choi | H04L 9/3231 |
| 2015/0067329 | A1 | 3/2015 | Ben et al. | |
| 2015/0156266 | A1 | 6/2015 | Gupta | |
| 2015/0222621 | A1* | 8/2015 | Baum | H04W 4/70 |
| | | | | 726/9 |
| 2016/0248746 | A1* | 8/2016 | James | H04W 4/70 |
| 2017/0195318 | A1* | 7/2017 | Liu | H04W 12/06 |

FOREIGN PATENT DOCUMENTS

| CN | 204408361 | 6/2015 |
| WO | 2015056009 | 4/2015 |

OTHER PUBLICATIONS

PUBNUB, Inc., "A New Approach to IoT Security—5 Key Requirements to Securing IoT Communications", Jul. 27, 2015, 8 pages.

* cited by examiner

*Primary Examiner* — Amare F Tabor
(74) *Attorney, Agent, or Firm* — Brooks Cameron & Huebsch, PLLC

(57) ABSTRACT

Example implementations relate to secure messages for IoT devices. For example, a system for secure messages for IoT devices may include an IoT device coupled to a network including a plurality of web services. The IoT device may store a service certificate for each of the plurality of web services, generate a secure message for a web service among the plurality of web services using the stored service certificate for the web service, and send the secure message to the web service without first establishing a connection between the IoT device and the web service.

14 Claims, 3 Drawing Sheets

SECURE MESSAGES FOR INTERNET OF THINGS DEVICES

BACKGROUND

Messages may be sent between Internet of Things (IoT) devices and web services and/or other IoT devices. As used herein, IoT refers to an architecture which provides for interconnecting a network such as the Internet with communicating and/or perceived objects. IoT devices may be subject to firewalls, observation, modification, forgery and/or denial of service attacks.

DETAILED DESCRIPTION

Figure 1:
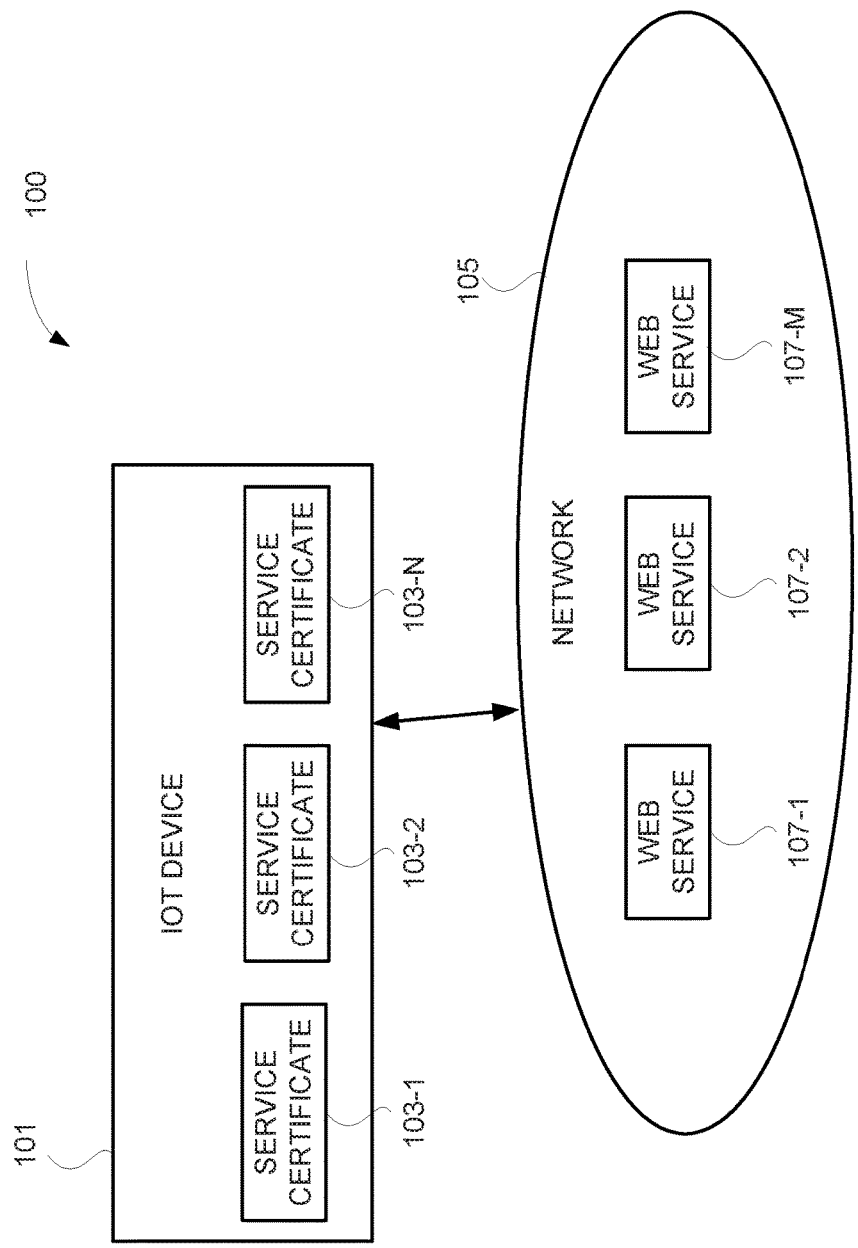
FIG. 1 illustrates an example system consistent with the present disclosure.

An IoT device may rely on decentralized communication schemes, while implementing autonomous mechanisms. As used herein, an IoT device refers to a hardware device, vehicle, building, or other item embedded with electronics, instructions, sensors and/or network connections, that enable the IoT device to exchange information with other IoT devices and/or web services provided by the IoT. An IoT device may have a passive communication interface, such as a quick response (QR) code, a radio-frequency identification (RFID) tag, a near-field communication (NFC) tag, and portable storage media, among others, or an active communication interface, such as a modem, a transceiver, or transmitter-receiver, among other examples. An example of an IoT device may be a web connected printer, among other examples.

It may be important that the recipient of a message from an IoT device is able to authenticate the message. Furthermore, it may be important that the message is encrypted during transmission from the IoT device to the recipient. Moreover, a single IoT device may communicate with several independent web services (e.g., recipients) and, due to varying uptime and methods of communication, the messages may arrive out of order, or "asynchronously" as used herein.

Web services may need to be able to scale the number of devices to which they communicate rapidly with low overhead on message transmission so as not to become a bottleneck. Also, messages may vary in size such that message services need to accommodate varying file sizes.

Some IoT devices that connect with a web service (or other IoT device) utilize a series of "hand-shakes" or initial authentications before secure communication between the two may be performed. This hand shake may be used to identify the device and service and the capabilities of each to communicate just as humans when first meeting will greet each other to identify and establish preferred language for further communications. Once the device and the service have established a secure connection, then secure messages may be transmitted between the two. Put another way, these systems require some sort of prior negotiation. To start a connection to a service, the device and the service must exchange two (or more) pieces of data and from there they can generate a secure session.

In contrast, secure messaging for IoT devices, according to the present disclosure, includes a new secure messaging service. Secure messaging for IoT devices in accordance with the present disclosure provides that when an IoT device generates a first packet to be sent to a recipient such as a server, other IoT device and/or web service, it is a one way communication meaning there is no requirement that the recipient reply to the IoT device before the recipient can read the contents of the message. Put another way, a secure message may be sent between the IoT device and the recipient without first initiating a hand-shake. No prior negotiation is required before the payload of the message is sent to the recipient. However, using the secure messages for IoT devices as described herein, the recipient of the message may guarantee that the sender (e.g., the IoT device) is a trustworthy sender, thus enabling efficient and secure message transmission. As used herein, a "secure message" refers to any form of message that possesses some or all of the following characteristics: integrity, authentication, non-repudiation, forward secrecy, and/or confidentiality. A secure message may, in some instances, be referred to as an "encrypted message".

FIG. 1 illustrates an example system 100 consistent with the present disclosure. As illustrated in FIG. 1, the system 100 may include an IoT device 101 coupled to a network 105 including a plurality of web services 107-1, 107-2, . . . , 107-M (herein referred to collectively as "web services 107"). While the IoT device 101 is discussed as being "coupled" to the network 105, it is to be understood that the IoT device 101 does not need to be continuously or "live" coupled to the network 105. That is, the IoT device 101 may be periodically disconnected from the network 105 and reconnected at a later time. Although not illustrated in FIG. 1, the system 100 may include additional components. For instance, the IoT device 101 may connect to the web services 107 via a plurality of additional IoT devices and/or additional web services, referred to herein as "nodes". Also, while the network 105 is illustrated in FIG. 1 to comprise a plurality of web services 107, it is noted that the network 105 may be interpreted to also include the IoT device 101. Put another way, the construct of the system 100 is not limited to the arrangement illustrated in FIG. 1.

Sending of a message from the IoT device 101 to a web service such as 107-2 may be highly complex, including multiple nodes (such as multiple IoT devices and/or multiple web services), and the multiple nodes may be connected at different times. Put another way, the system 101 may carry the payload of a message at different times. For instance, a message may be transmitted from the IoT device 101 to an external flash drive (not illustrated in FIG. 1), the message may then be transmitted to a second IoT device (not illustrated in FIG. 1), to a first web service such as web service 107-1, then finally to web service 107-2. The transmission of the message between each of those components may be performed in vastly different times, such as several minutes or hours apart. While some systems require that the devices transmitting the message be connected in a live manner, secure messages for IoT devices as described in the present disclosure may allow for asynchronous transmission of messages. That is, the device, devices, and/or web services do not need to be connected in a live manner.

The IoT device 101 may perform a number of functions. For instance, the IoT device 101 may store a device certificate. That is, the IoT device 101 may have a device certificate, issued by a certificate authority that includes a public and private key pair. Similarly, each of the plurality of web services 107 may have a separate service certificate 103-1, 103-2, . . . , 103-N (collectively referred to herein as "service certificates 103"). That is, web service 107-1 may be associated with service certificate 103-1, web service 107-2 may be associated with service certificate 103-2, and web service 107-M may be associated with service certificate 103-N. Every entity in the system 100 may have its own certificate, though each certificate may be generated by a common entity, such as the certificate authority. The IoT device 101 may be knowledgeable of the service certificates 103 for each web service 107, though the web services 107 may not be knowledgeable of the device certificate for the IoT device 101 until a message is received from the IoT device 101.

In some examples, the IoT device 101 may have all of the service certificates 103 loaded at the time of manufacture of the IoT device 101. However, examples are not so limited, and the service certificates 103 may be saved on the IoT device 101 at some other time. As described herein, the web services 107 do not need to have the device certificate because when a service receives a device certificate, the web service may authenticate the IoT device 101 by identifying the certificate authority, as described further herein. Put another way, the IoT device 101 may know the service certificate (e.g., service certificates 103), but the web services 107 may not know the device certificate prior to message transmission.

The IoT device 101 may store a service certificate for each of the plurality of web services 107. That is, the IoT device 101 may store service certificate 103-1 for web service 107-1, service certificate 103-2 for web service 107-2, and service certificate 103-N for web service 107-M. The IoT device 101 may also generate an encrypted message for a web service (e.g., 107-1) among the plurality of web services using the stored service certificate for the web service. For instance, the IoT device 101 may generate an encrypted message for web service 107-1 using service certificate 103-1. Similarly, the IoT device 101 may generate an encrypted message for web service 107-2 using service certificate 103-2. Moreover, the IoT device 101 may generate an encrypted message for web service 107-M using service certificate 103-N. As discussed further herein, the encrypted message may be generated for a first message transmitted between the IoT device 101 and the web service (e.g., 107-1), whereas all subsequent messages sent between the IoT device 101 and the web service may utilize a shared secret. Furthermore, the payload of the message may be encrypted using the shared secret, but also using message specific information. That is, in each secure message, a different key may be used.

The IoT device 101 may also send the encrypted message to the web service without first establishing a connection between the IoT device and the web service. For instance, the IoT device 101 may send the generated encrypted message to web service 107-1 without first initiating a "hand-shake" or other authorization procedure. The first message sent from the IoT device 101 to the web service 107-1 may serve to authenticate the two entities, and also transmit the payload of the message to the web service 107-1.

To ensure security of the message, the IoT device 101 may generate a random value from a payload of the message, and encrypt the payload with a public key associated with the stored service certificate. For instance, the IoT device 101 may generate a random value from the payload of the message to be sent to web service 107-1, and encrypt the random value that with service certificate 103-1, e.g., with a service public key associated with service certificate 103-1, where the encrypted random value is included in the payload of the secure message. As such, that first message includes a random number that is encrypted with the service certificate of the web service that is intended to receive the message. That is, the payload of the message may be encrypted, and the encryption key may be derived from that same payload. Put another way, secure messages for IoT devices according to the present disclosure, may include the use of an asymmetric key exchange protocol, where the IoT device 101 may register with each of the plurality of web services 107 by creating a message, including within the message the IoT device's 101 public key and encrypting the message with the public key of the respective web service. The web service (e.g., web service 107-1), on receipt of the message may authenticate and decrypt the message using the web service's complementary private key, then authenticate the public key of the IoT device 101 using the certificate authority key it received from the originating secure service (e.g., from the certificate authority), as described further herein. By encrypting and authenticating the messages at end-points, the message content can't be read or modified during transmission, meaning that the messages may be transported over non-secure networks and/or network proxies, even in an asynchronous manner.

The IoT device 101 may also generate an IoT device signature using a private key for the IoT device 101. That is, the IoT device 101 may generate a signature using the private key for the IoT device 101, the private key associated with the device certificate for the IoT device 101, the device certificate assigned by the certificate authority, as described previously. The receiving web service may verify the authenticity of the IoT device 101 using the signature.

Put another way, an encrypted message sent from the IoT device 101 may include a plurality of components: a key material payload, an encrypted payload, a public certificate for the IoT device, and a signature for the IoT device generated using a private key for the IoT device, among other components. As used herein, a key material payload refers to any material included in the encrypted message, and used to derive a shared secret, as discussed further herein. As described herein, the first message sent between the IoT device 101 and the web service may include the key material payload, whereas subsequent messages (e.g., those messages sent after the first message) may not include a key material load.

In some examples, the IoT device 101 may generate a timestamp indicating a time of generation of the encrypted message, and include the time-stamp in the encrypted message. Put another way, the encrypted message sent from the IoT device 101 to the web service (e.g., web service 107-2) may include a message identifier (ID) and/or an expiration date. This allows the web service to determine an order in which messages have been received, to ignore old or out of sequence messages and to not fear a replay attack where an attacker sends copies of a legitimate message at a later time. Also, by storing the public key of each web service for which the IoT device 101 is intended to communicate, the IoT device 101 may create messages for each of the plurality of web services 107 in the frequency desired by the web service. The use of message IDs may help each web service to identify the sequence with which it was intended to receive messages. The message itself may contain a timestamp and a sequence number, which is specific to that IoT device 101 and that web service, so that when the web service receives the message, it can decide if it is an old one that should be discarded, or something else. That is, the IoT device 101 may generate a sequence number specific to the IoT device and web service pair, where the sequence number identifies an order in which the message is to be reconstructed by the web service relative to other messages. As such, the sequence number may allow the recipient (e.g., web service) to reconstruct messages in the correct order, and ignore out of order messages.

As used herein, a time-stamp refers to a recording of a time of generation of a particular message. However, in some examples, the message may include an expiration date or time in addition to or instead of the time-stamp. IoT device 101 may communicate with a web service 107-1 over multiple channels, some which might be direct connections and some which might be indirect connections. For instance, a user of IoT device 101 may store the message from IoT device 101 on a flash drive, walk out of a building, put the flash drive in a second IoT device and send the message to web service 107-1. In another example, a user of IoT device 101 may transfer the message to a smart phone, leave a Wi-Fi network and access a phone network, then send the message to web service 107-1. In such examples, the time-stamp and/or expiration date/time may indicate that the message may be discarded after a particular day and/or time because the contents of the message are either outdated and/or considered not secure. As such, the IoT device 101 may generate an expiration time after which the encrypted message is no longer usable by the web service (e.g., 107-1), and include the expiration time in the encrypted message.

In some examples, a payload of the encrypted message may comprise a plurality of references to a multipart packet. For instance, the entire payload of the message sent from the IoT device 101 to the web service 107-1 may comprise a multipart multipurpose internet mail extension (MIME) message. For instance, the payload of the message may not be in the message itself, but the multipart MIME may comprise the entire payload, and the message may reference an entry or a plurality of entries in the multipart MIME message. Such examples may be used for point to point delivery of video, contracts, or other large files between the IoT device 101 and the web service (e.g., 107-1, for example). In some examples, the payload of the secure message may comprise a reference to a plurality of resources including at least one of: a uniform resource locator (URL), other packets or files sent from the IoT device, an http multipart payload, and/or a multiple part payload within the secure message.

As such, when the IoT device 101 sends a message to a web service, such as web service 107-2, four components may be included in the message. First, the key material payload that the web service may use to retrieve the encryption key to decrypt the payload of the message. Second, the encrypted payload of the message. Third, the IoT device public key so that the web service may verify that the public key is correct because the certificate authority is common to all entities. Last, an IoT device signature that the web service may verify by using the IoT device public key, which is also included in the message. All four of these elements may be included in the same message. Therefore, upon receipt, the web service (e.g., web service 107-1) may have all the information that is needed to verify the IoT device signature, verify the IoT device certificate is legitimate by identifying the certificate authority, use the key material payload to derive the encryption key, and to decrypt the payload of the message.

Figure 2:
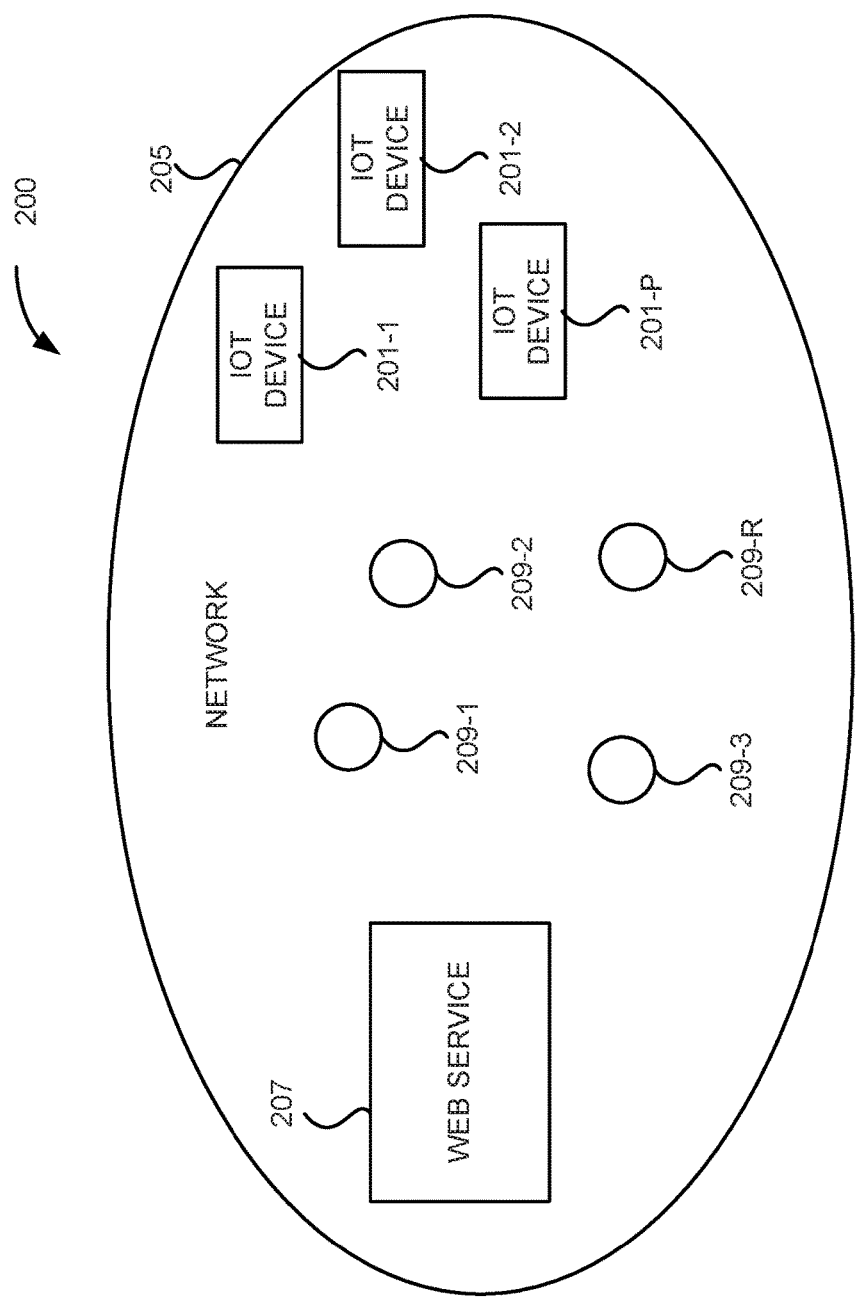
FIG. 2 illustrates an example system consistent with the present disclosure.

FIG. 2 illustrates an example system 200 consistent with the present disclosure. The system 200 illustrated in FIG. 2 may be analogous to system 100 illustrated in FIG. 1. As such, the system 200 may include a web service 207 coupled to a network 205 including a plurality of IoT devices 201-1, 201-2, . . . , 201-P (collectively referred to herein as "IoT devices 201").

The web service 207 may perform a number of functions. For instance, the web service 207 may receive a secure message from an IoT device among the plurality of devices (such as IoT device 201-1) without first establishing a connection between the device and the web service, as discussed in relation to FIG. 1. Also, the web service 207 may verify the device (e.g., IoT device 201-1) using the message signature for the device, and decrypt a payload of the secure message using data contained within the secure message.

In some examples, the web service 207 may retrieve an IoT device certificate from the secure message, retrieve a public key from the secure message, and verify the signature using the using a public key of the IoT device certificate. As described in relation to FIG. 1, the IoT device (e.g., 201-1) may generate an IoT device signature using a private key for the IoT device, and the web service 207 may verify the authenticity of the IoT device 201-1 using the signature.

Also, in some examples, each of the plurality of IoT devices 201 may be associated with a separate respective IoT device certificate generated by a same certificate authority. As used herein, a certificate authority refers to an entity that issues digital certificates. As such, each of the plurality of IoT device may have a separate device certificate, though all device certificates may be generated from the same certificate authority. In such examples, the web service 207 may receive an IoT device certificate from the IoT device (e.g., 201-1), identify a certificate authority which generated the IoT device certificate, and verify the IoT device certificate based on the identification of the certificate authority. That is, the web service 207 may identify the certificate authority using a signature of the certificate authority, which was included in the secure message.

As illustrated in FIG. 2 and discussed in relation to FIG. 1, sending of a message from an IoT device such as IoT device 201-2 to web service 207 may be highly complex, including nodes 209-1, 209-2, 209-3, . . . 209-R. As discussed previously, the IoT device may generate a time-stamp indicating a time of generation of the encrypted message, and include the time-stamp in the encrypted message. Put another way, the encrypted message sent from the IoT device to the web service 207 may include a message identifier ID and/or an expiration date allowing asynchronous communication between the IoT devices 201 and the web service 207. As discussed in relation to FIG. 1, the web service 207 may receive a key material payload within the secure message, and the web service 207 may generate an encryption key to decrypt the payload using the key material payload.

Figure 3:
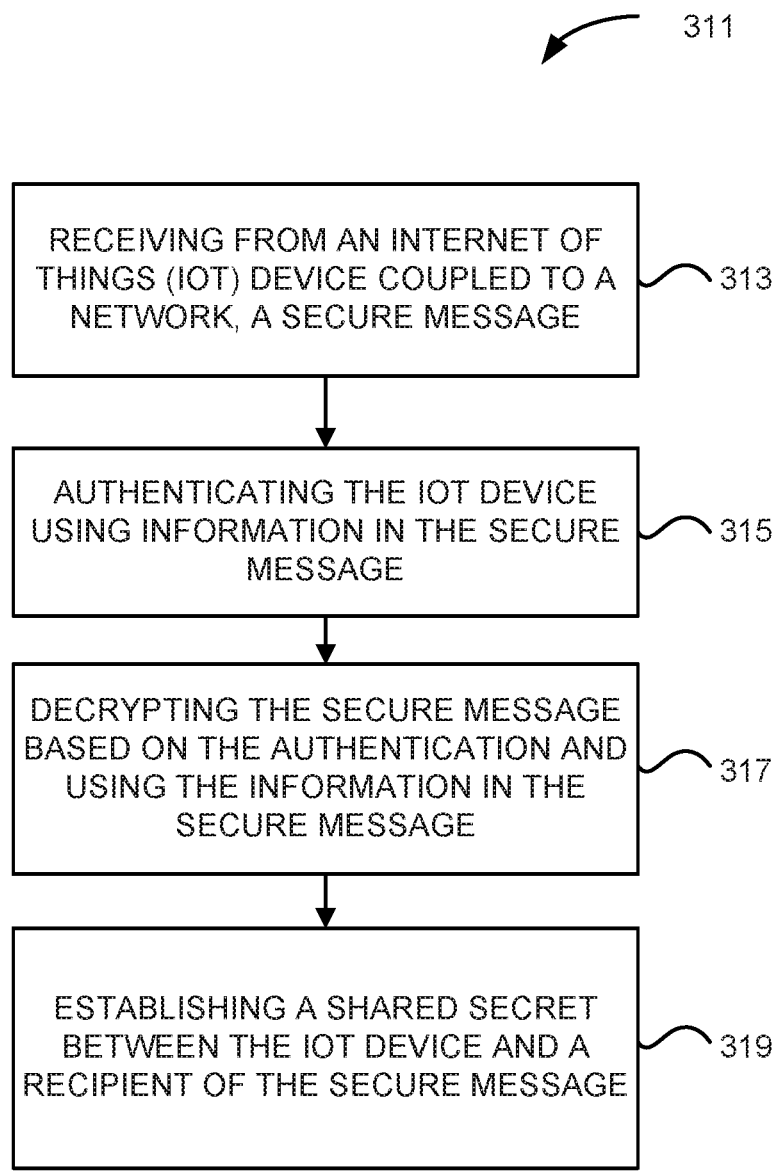
FIG. 3 illustrates a method consistent with the present disclosure.

FIG. 3 illustrates a method 311 consistent with the present disclosure. As illustrated in FIG. 3, the method 311 may include receiving from an IoT device coupled to a network, a secure message without prior communication with the IoT device, at 313. As discussed in relation to FIGS. 1 and 2, the information needed by the recipient of the message to authenticate the sender (e.g., the IoT device) and decrypt the payload of the message may be included in the message itself. As such, no "hand-shake" or other prior authentication may be needed between the IoT device and the web service before secure communication may persist.

Further, the method 311 may include authenticating the IoT device using information in the secure message, at 315. For instance, as described in relation to FIG. 2, the web service may identify the IoT device certificate included in the message, and identify the certificate authority that generated the IoT device certificate. By determining that the certificate authority that generated the IoT device certificate is correct, the web service may authenticate the IoT device certificate. Furthermore, the web service may verify the signature of the IoT device, by verifying the certificate authority that generated the IoT device certificate.

Also, the method 311 may include decrypting the secure message based on the authentication and using the information in the secure message, at 317. For instance, the web service may derive the encryption key from the message, and decrypt the message using the derived encryption key.

In some examples, the method 311 may include establishing a shared secret between the IoT device and a recipient of the secure message, for end-to-end authenticated and encrypted communication between the IoT device and the recipient. As used herein, a "shared secret" refers to a secret known by both the IoT device and the recipient (e.g., web service) that enables continued secure communications without subsequent transmission of authentication information. Such shared secrets may continue for a longer period of time than average communications. For instance, a shared secret may enable secure communication between the web service and the IoT device for days, weeks, or even months, depending on the web service 207.

In some examples, establishing the shared secret may include persisting the shared secret across a plurality of secure messages, and using the shared secret for transmission of the plurality of secure messages to and from the IoT device. Put another way, once the shared secret is established, it may be utilized in a plurality of subsequent secure messages, transmitted to and/or from the IoT device. That is, the shared secret can be used for subsequent messages in either direction between the IoT device and the web service.

The method 311 may include storing the shared secret on the IoT device and the recipient. For instance, referring to FIG. 2, both the IoT device (e.g., IoT device 201-1) and the web service (e.g., web service 207) may store a shared secret for an IoT device-web service pair. That is, a first shared secret may be generated for communication between IoT device 201-1 and web service 207, a second shared secret may be generated for communication between IoT device 201-2 and web service 207, and a third shared secret may be generated for communication between IoT device 201-P and web service 207. This shared secret may be a small key, such as a 128 bit (or 16 byte) nonce. Once the shared secret is saved on both the IoT device and the web service, subsequent messages transmitted between the two may include less information. That is, subsequent messages (e.g., after the first message between the IoT device and the recipient), may not contain the information used to establish a secure message. Further, the method 311 may include using the shared secret for encryption and decryption of subsequent secure messages between the IoT device and the recipient, and maintaining the shared secret until the IoT device or the recipient initiates a key renewal procedure. That is, the shared secret may be used until either the web service or the IoT device initiates a key renewal, in which case the processes described in relation to FIGS. 1 and 2 may be repeated.

In some examples, the method 311 may include transmitting a plurality of independent secure messages to or from the IoT device by incorporating a timestamp in each of the plurality of independent secure messages. As described in relation to FIG. 2, each message may include a message ID and/or other timestamp that identifies a time of generation of the message and/or an expiration date or time of the message.

In the foregoing detailed description of the present disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the present disclosure.

The figures herein follow a numbering convention in which the first digit corresponds to the drawing figure number and the remaining digits identify an element or component in the drawing. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense. As used herein, the designators "N", "M", and "P", particularly with respect to reference numerals in the drawings, indicate that a number of the particular feature so designated can be included with examples of the present disclosure. The designators can represent the same or different numbers of the particular features. Further, as used herein, "a number of" an element and/or feature can refer to one or more of such elements and/or features.

What is claimed:

1. A system including:
   an Internet of Things (IoT) device coupled to a network including a plurality of web services, the IoT device to:
      store a service certificate for each of the plurality of web services;
      generate a secure message for a web service among the plurality of web services using the stored service certificate for the web service; and
      send the secure message to the web service without first establishing a connection between the IoT device and the web service, wherein the secure message includes: a key material payload, an encrypted payload, a public certificate for the IoT device, and a signature for the IoT device generated using a private key for the IoT device.

2. The system of claim 1, further including the IoT device to:
   generate a random value; and
   encrypt the random value with a public key associated with the stored service certificate, wherein the encrypted random value is included in the payload of the secure message.

3. The system of claim 1, further including the IoT device to:
   generate an IoT device signature using a private key for the IoT device.

4. The system of claim 1, further including the IoT device to:
   generate a time-stamp indicating a time of generation of the secure message; and
   include the time-stamp in the secure message.

5. The system of claim 1, further including the IoT device to;
  generate an expiration time after which the secure message is no longer usable by the web service; and
  include the expiration time in the secure message.

6. The system of claim 1, further including the IoT device to:
  generate a sequence number specific to the IoT device and the web service;
  wherein the sequence number identifies an order in which the secure message is to be reconstructed by the web service relative to other secure messages.

7. The system of claim 1, wherein a payload of the secure message comprises a reference to a plurality of resources including at least one of;
  a uniform resource locator (URL);
  other packets or files sent from the IoT device;
  an http multipart payload; and
  a multiple part payload within the secure message.

8. A system comprising:
  a web service coupled to a network including a plurality of internet of things (IoT) devices, the web service to:
    receive a secure message from a device among the plurality of devices without first establishing a connection between the device and the web service;
    verify the device using a signature for the device;
    decrypt a payload of the secure message using data contained within the secure message;
    receive an IoT device certificate from the IoT device;
    identify a certificate authority which generated the IoT device certificate using a signature of the certificate authority; and
    verify the IoT device certificate based on the identification of the certificate authority.

9. The system of claim 8, further including the web service to:
  retrieve an IoT device certificate from the secure message;
  retrieve a public key from the secure message; and
  verify the signature using a public key of the IoT device certificate.

10. The system of claim 8, wherein each of the plurality of IoT devices is associated with a separate respective IoT device certificate generated by a same certificate authority.

11. The system of claim 8, further including the web service to:
  receive a key material payload within the secure message; and
  generate an encryption key to decrypt the payload using the key material payload.

12. A method comprising:
  receiving from an internee of things (IoT) device coupled to a network, a secure message without prior communication with the IoT device;
  authenticating the IoT device using information in the secure message;
  decrypting the secure message based on the authentication and using the information in the secure message;
  establishing a shared secret between the IoT device and a recipient of the secure message, for end-to-end authenticated and encrypted communication between the IoT device and the recipient;
  storing the shared secret on the IoT device and the recipient;
  using the shared secret for encryption and decryption of subsequent secure messages between the IoT device and the recipient; and
  maintaining the shared secret until the IoT device or the recipient initiates a key renewal procedure.

13. The method of claim 12, wherein establishing the shared secret includes:
  persisting the shared secret across a plurality of secure messages; and
  using the shared secret for transmission of the plurality of secure messages to and from the IoT device.

14. The method of claim 12, further comprising:
  transmitting a plurality of independent secure messages to or from the IoT device by incorporating a time-stamp in each of the plurality of independent secure messages.

* * * * *

UNITED STATES PATENT AND TRADEMARK OFFICE
CERTIFICATE OF CORRECTION

PATENT NO. : 10,084,760 B2
APPLICATION NO. : 15/068112
DATED : September 25, 2018
INVENTOR(S) : Laurent Pizot et al.

It is certified that error appears in the above-identified patent and that said Letters Patent is hereby corrected as shown below:

In the Claims

In Column 9, Line 2, Claim 5, delete "to;" and insert -- to: --, therefor.

In Column 9, Line 15, Claim 7, delete "of;" and insert -- of: --, therefor.

In Column 10, Line 11 approx., Claim 12, delete "internee" and insert -- internet --, therefor.

Signed and Sealed this
Third Day of December, 2019

Andrei Iancu
*Director of the United States Patent and Trademark Office*